ional Patent

[19] 3,878,813
Roberson et al.
[45] Apr. 22, 1975

[54] STRAND COATING AND DOCTORING APPARATUS

[75] Inventors: Cletis L. Roberson, Newark; Robert G. Russell, Granville; Ralph M. Stream, Newark; Harold E. Leaman, Granville, all of Ohio

[73] Assignee: Owens-Corning Fiberglas Corporation, Toledo, Ohio

[22] Filed: Jan. 22, 1973

[21] Appl. No.: 325,269

Related U.S. Application Data

[62] Division of Ser. No. 847,669, Aug. 5, 1969, abandoned.

[52] U.S. Cl. ............... 118/104; 118/117; 118/420
[51] Int. Cl. ............................................. B05c 11/02
[58] Field of Search ............ 118/104, 106, 114–119, 118/121, 125, 234, 405, 420, 122, DIG. 18–DIG. 22; 100/121, 168; 117/102 L, 102 R, 111 B; 425/115, 165, 363, 365, 392; 68/99, 260–262, 256

[56] References Cited
UNITED STATES PATENTS

| 357,515 | 2/1887 | Wood et al. ........................ 118/33 |
| 1,055,404 | 3/1913 | Kremer .............................. 118/117 |
| 2,596,154 | 5/1952 | Keating et al. ................... 118/119 X |
| 2,686,638 | 8/1954 | Horvat ............................ 118/117 X |
| 2,763,563 | 9/1956 | Clougherty et al. ........ 118/119 UX |
| 2,878,778 | 3/1959 | Kusters ............................... 68/99 |
| 3,001,390 | 9/1961 | Zimmer ............................ 68/99 X |
| 3,405,006 | 10/1968 | Follrath .......................... 118/117 X |

Primary Examiner—Morris Kaplan
Attorney, Agent, or Firm—Carl G. Staelin; John W. Overman; Kenneth H. Wetmore

[57] ABSTRACT

Fibrous glass strands are impregnated and coated with an elastomeric material by passing each strand through an immersion bath and between a pair of wheels rotating in circumferential contact. The wheel contact surfaces are elastomeric annuli capable of being deformed around each moving strand to envelop it and perform the functions of a die in removing excess impregnant therefrom. Pressure exerted by the wheel elastic surfaces is varied as a means of selectively controlling the impregnant weight and uniformity per unit length of strand.

2 Claims, 10 Drawing Figures

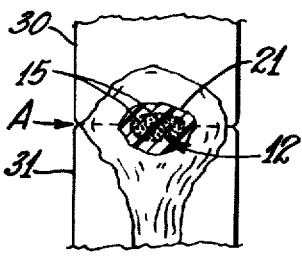
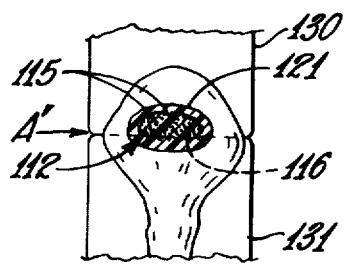
Fig. 6  Fig. 7
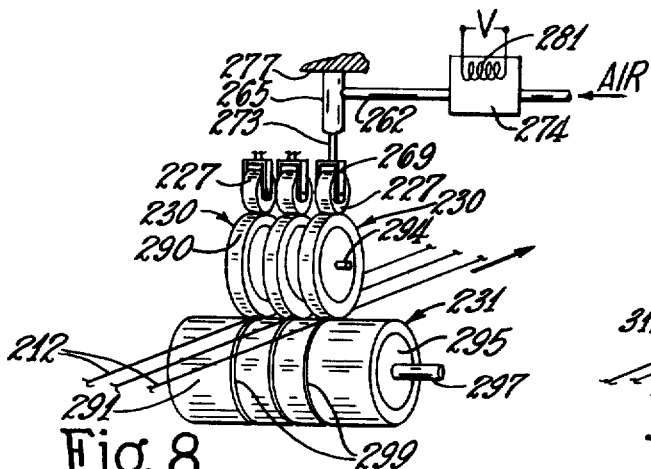
Fig. 8
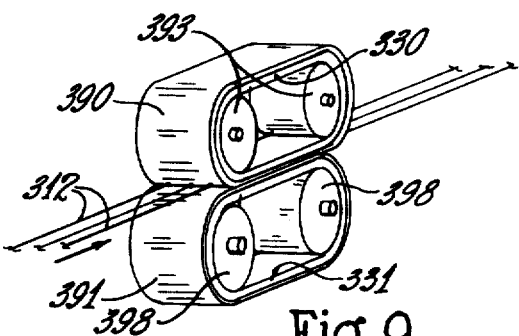
Fig. 9
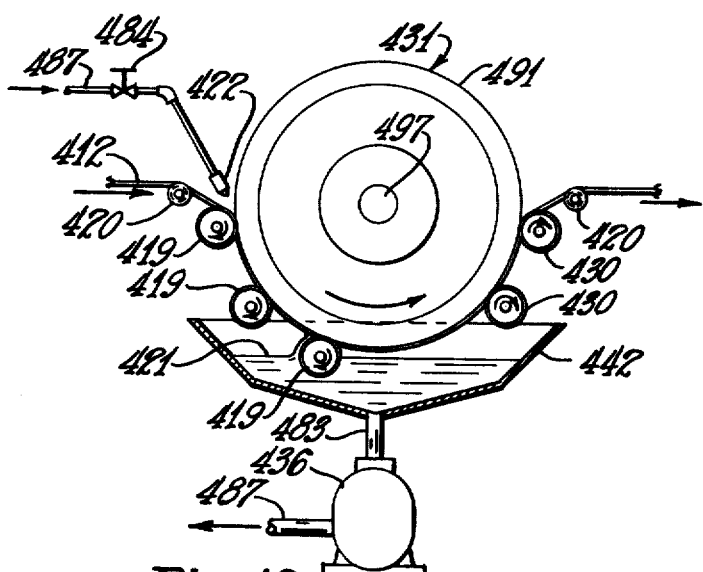
Fig. 10

STRAND COATING AND DOCTORING APPARATUS

This is a division of application Ser. No. 847,669, filed Aug. 5, 1969, now abandoned.

The present invention relates generally to the controlled application of a coating or impregnant to various natural and synthetic fibers, strands, cords, rovings or other finely elongated materials such as monofilament and stranded metallic wires. It should be understood that discussion of the invention herein is limited primarily to the impregnation of fibrous glass strands simply as a matter of exemplifying the prevalent features and embodiments.

For economical and technical reasons, producers of treated fibrous strands have constantly sought to maintain a high degree of impregnation uniformity while simultaneously achieving complete permeation. Effective penetration has normally required thorough strand saturation with a moderately low viscosity dispersion or solution and consequently this has made control of overall uniformity difficult.

Conventional fixed dies employed to strip excess impregnant from moving fibrous strands have provided reasonably accurate and uniform control over the process but from a manufacturing viewpoint the standard die system has several disadvantages. The most significant disadvantage stems from the latent inability of the system to function for long periods of operation without clogging. For example, the throat of the die orifice tends to accumulate a residue of dried impregnant as well as trap other solid particles such as strand fuzz and the like. These trash deposits constrict orifice diameter and account for a high incidence of strand breakage and poor impregnation quality.

Furthermore, present high production speeds coupled with the natural abrasiveness of fibrous materials, glass fibers in particular, have drastically reduced the life span of even the most durable dies. Replacement of worn or defective dies naturally requires numerous process interruptions. These interruptions and those necessarily incurred for installation of different die sets for the purpose of changing product specification may be prohibitive in regard to maintaining desirable operating efficiencies.

In view of the limitations and soaring replacement costs of fixed dies, including resultant declines in operating efficiencies, it becomes apparent that this method of controlling fibrous strand coating and impregnation is no longer economically favorable. This is basically true of all static wiping systems, e.g. bristle brushes, notched gates, etc.

According to the present invention, it has been discovered that dynamic apparatus may be utilized to eliminate many objectionable features of passive strand wiping systems without destroying desirable attributes. The innovation is to provide two adjacent surfaces which are resilient and soft enough to surround the strand and wipe it as it passes between. Characteristically, the surfaces are moved in an endless or continuously renewing fashion to inherently clean themselves of troublesome debris.

Since impregnant removal capacity relates directly to the pressure exerted on the strands, it has further been discovered that the die contact surfaces may be made compressible to perform varying selected degrees of wiping without entailing an interruption of manufacturing operations. In addition, this type of variable die wiping offers a limited means for regulating or varying strand cross sectional shape.

The present invention is directed to a fibrous strand impregnation system capable of uniformly controlling the degree of impregnant applied to a given length of the linear material.

Another object of the invention is to provide a strand impregnation system wherein a die apparatus functions dynamically to remove excess impregnant from the strand.

Another object is the elimination of strand die clogging by continually removing that matter which tends to accumulate and restrict die orifice size.

A further object is the provision of a strand die having a constantly renewed wiping surface.

Still another object is the provision of a strand die having adjustment features for selectively controlling impregnation quantity without process interruption.

Another object of the invention is optimization of strand impregnation efficiencies by the provision and use of a strand die having low wearing and substantially non-abrading contact surfaces.

Other and more specific objects and advantages will become apparent from the following more detailed written description wherein reference is made to the accompanying drawings in which.

Figure 5:
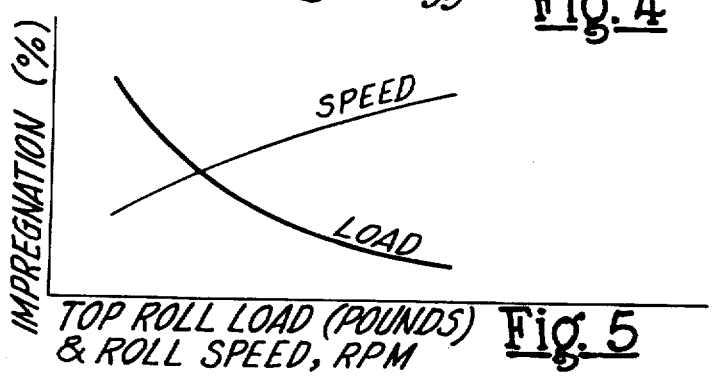

FIG. 5 graphically depicts degree of strand impregnation for various die compressive forces and die wheel speeds.

Figure 4:
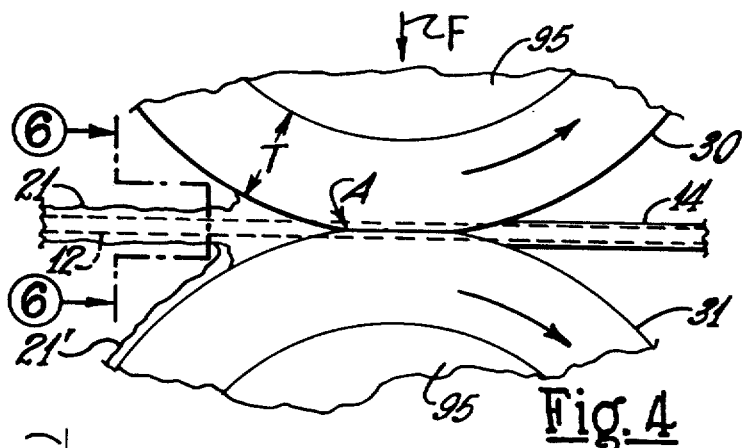
FIG. 4 is a greatly enlarged fragmentary side elevation of an impregnated glass strand passing between the rotary die wheels shown in FIGS. 1–3.

FIG. 6 is a front elevation of the rotary die shown in FIG. 4 with a section taken along line 6—6 of FIG. 4.

FIG. 7 shows another rotary die similar to that of FIG. 6 wherein one of the contact surfaces is fabricated from a different material and has a plurality of grooves in the circumferential surface thereof.

Figure 2:
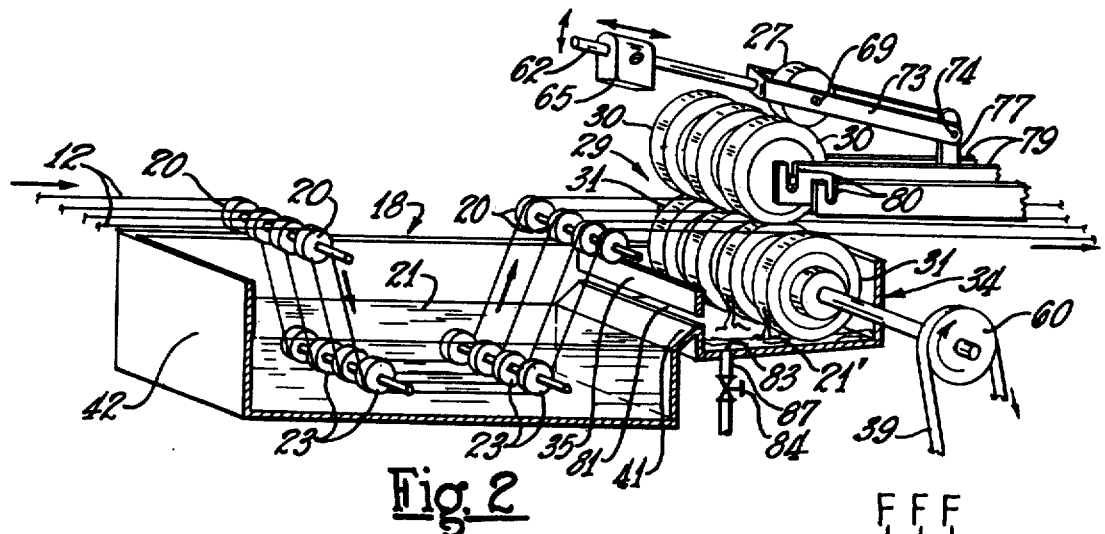
FIG. 2 is an enlarged isometric view in partial section of the impregnation apparatus shown in FIG. 1.

FIG. 8 is a modification of the invention shown in FIG. 2 featuring a common grooved drive roll and automatic die compression control.

FIG. 9 is another modification of the invention shown in FIG. 2 wherein the die is formed between a pair of endlessly moving belts.

FIG. 10 is still a further modification of the invention shown in FIG. 2 which is designed to increase strand impregnant penetration and die wiping capacity.

Figure 1:
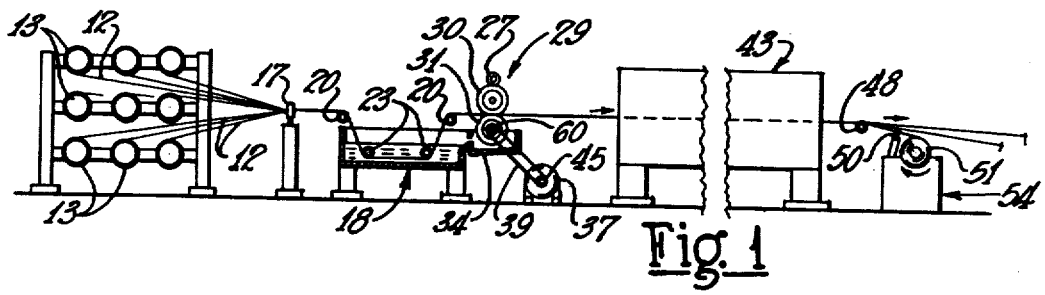
FIG. 1 is a side elevation, shown somewhat diagrammatically, of a glass strand impregnation or treatment production line which includes the impregnation apparatus of this invention.

Referring now more specifically to the drawings, FIG. 1 shows a production operation wherein linear materials in the form of fibrous glass strands 12 are pulled from creel mounted packages 13 through individual guide eyes 17. The strands are then guided by grooved surfaces or pulleys 20 and 23 through an impregnating bath 18 and a rotary die apparatus 29. Ultimately, the strands 12 are passed through a curing oven 43 whereupon exiting they are directed by roll 48 to individual traversing guides 50 and winders 54 which collect them into finished packages 51. The initial treadup of the production line is manually accomplished but thereafter strand moving forces are supplied entirely by winders 54.

As may be seen in FIG. 2, groups of pulleys 20 and 23 are laterally disposed in spaced aligned relationship to thereby separately guide the strands 12 in parallel fashion through the impregnating bath 18 comprised of a reservoir 42 containing therein an impregnant or adjunctive material 21. In passing through the bath 18, strands 12 are saturated with the impregnant 21 to generously coat the outer surface of the composite strand as well as each individual filament. To achieve complete penetration and coating, the strands 12 are subjected to the impregnant long enough to accomplish the viscous work necessary in overcoming the influence of variables such as the respective mechanical and chemical cohesiveness of the individual filaments and the impregnant. For the purpose of illustration, the impregnant material 21 is exemplified by an elastomeric dispersion. Other coating materials including an aqueous or non-aqueous solution of a film-forming composition or a hot melt or a solvent free material which is liquid at room temperature but which may be hardened by a subsequent chemical or thermal condition may be applied equally as well by using the techniques of this invention. Desirable but optional additives such as pigments, dyes, plasticizers, emulsifiers, lubricants and coupling agents may also be added.

Emerging from bath 18, the strands 12 (FIGS. 1-4) travel horizontally between multiple l :rally spaced adjacent surfaces which are provided by wheel pairs or units 30 and 31 of the die apparatus 29. The bottom wheels 31 of the die apparatus 29 are fixedly mounted in equispaced fashion on a horizontal shaft 97 which has a rotational movement provided by a motor 37. The rotational driving force imparted to the shaft 97 and thus wheels 31 is transmitted by motor and shaft pulleys, 45 and 60, via an interconnecting belt 39 or any other conventional transmission means.

Top wheels 30 are provided with separate short axles or fixed shafts 94 which extend through the rotational centers of the wheels and project an equal distance on each side. Each of the wheels 30 is removably mounted by horizontal insertion of its shaft 94 into vertical U-shaped slots 80 located in a pair of support bars 79 on opposite sides of each wheel mounting position. The support bars 79 are secured to a fixed surface (not shown) in equispaced horizontal alignment and in relation to the bottom wheels such that when a top wheel shaft 94 engages a slot 80, wheels 30 and 31 are positioned in vertical alignment with their axes of rotation being parallel. Slots 80 are fabricated sufficiently deep to insure that the circumferential surface of wheel 30 comes to rest on the top edge of wheel 31 before shaft 94 rides to the bottom of the slots. In this manner, wheel 30 becomes somewhat of an idler wheel freely driven by the friction of its surface resting in contact with the surface of rotating wheel 31. For the purpose of clearly illustrating the movement of a strand 12 through the die as well as the die structure, one top wheel mounting position is shown as being vacant in FIG. 2.

Figure 3:
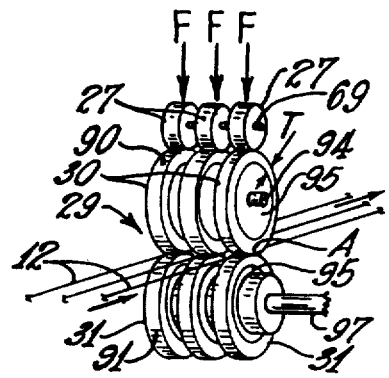
FIG. 3 is an enlarged fragmentary isometric view of the rotary die and pressure wheels shown in FIG. 2.

Notwithstanding the shaft mounting construction of each, wheels 30 and 31 are substantially identical. As shown in FIGS. 3 and 4, there is perpendicularly secured to each of the wheel shafts a disk or hub 95 which supports on its peripheral edge an elastomeric tire or annulus (90 or 91). The annuli 90 and 91 are adhesively secured to the rims 95, or may be assembled therewith by casting or stretch fitting. They are generally fabricated from a resilient non-wetting, non-abrasive wear resistant resilient material such as a foam, synthetic rubber, natural rubber and the like. As representative of these characteristics, the material used may desirably be a non-loading closed cell silicone foam known commercially as COHRlastic foam. For any suitable material, the elasticity may preferably be chosen within a durometer range of 20-55 units as measured on the Shore A scale.

Selection of a reasonably soft annulus material allows the wheel contact surfaces provided by the peripheral edges of annuli 90 and 91 to deform cooperatively or jointly around the moving strand 12 beginning at point A of the die wheel interface. As seen more specifically in FIG. 4, the strands 12 proceed from the impregnating bath with excessive and non-uniformly distributed amounts of impregnant 21 adhering thereto. The encirclement of each strand 12 by the wheel contact surfaces forms somewhat of a fixed die orifice causing a bight around the strand which effects removal of excess impregnant 21' and maintains a controlled disposition of the remaining impregnant 21 to produce a resultant uniformly coated strand 14.

Satisfactory die wiping action is developed by moving the contact surfaces of wheels 30 and 31 in a direction opposite to the strand movement or to each other or by unidirectional movement of all components with linear strand speed being much greater than the tangential speed of the wheel surfaces. The latter appears to be the more desirable with strand speeds being inclusively within the range of 100-1000 fpm and die wall speeds being within the range of 1-300 fpm. The wheels are sized to provide good tangential contact with the strand within limits dictated by the various component speeds.

The compressible wheel annuli 90 and 91 are further fabricated with a defined thickness T. Thus, an external wheel loading or deformation force may be directly correlated to the pressure exerted on the strands 12 by the moving die walls. By selectively loading the resilient wheel surfaces and/or by varying the speed of the die wheels, as seen in FIG. 5, a consequential variable control over degree of strand impregnation is accomplished. The range of thickness T wherein controlled strand wiping may be maintained is governed by practical limitations. For example, if T is too large, the compressive load will be absorbed in the bulk of the elastomeric; if too small, the wheel surfaces will not adequately envelop the strands. Speed control over the degree of impregnation is also limited by the degree of contact the wheel surfaces must have with the strand to produce a desired disposition of the impregnant.

Referring again to FIGS. 1-3, a die wheel loading force F is applied by a wheel 27 rolling in contact with the top surface edge of wheel 30. Wheel 27 is rotatably mounted on a shaft 69 supported by an elongated lever member 73. The lever 73 is pivotally supported at one end by a fixed block 77 and extending longitudinally from the opposite end there is a rod 62 which removably and slidably supports a static load or weight block 65. Alignment of the arrangement is such that wheel 27 acts as a rolling fulcrum for the lever 73 and exerts the downwardly distributed force F having a magnitude dependent on the weight of block 65 and the distance of separation therefrom. The force is transmitted by the fulcrum wheel 27 in a manner whereby the die wheels 30 and 31 are caused to exert a pressure on the strand 12 having a magnitude dependent on the magnitude of the force F. To selectively adjust the amounts of impregnant 21 removed from the strands 12, the force F and consequently the pressure on strands are varied by shifting position of block 65 or by replacing it with one of a different weight. As hereinafter discussed, force F may be readily supplied by other mechanical or pneumatic apparatus.

To break contact of wheels 27 and 30 and facilitate removal of the latter, the lever 73 need only be pivoted to an inoperative position (a clockwise direction as shown). Excluding materials that might cause excessive wear of elastomeric surface 90, wheels 27 are fabricated from a material generally rigid enough to definitively impart the force F. All other non-strand contacting parts, i.e. wheel supports 80, levers 73, etc. are constructed from a material such as stainless steel to impede oxidation and erosion.

A basin 34 is located directly beneath die apparatus 29 to collect excess impregnant 21' removed from the strands 12. An opening 83 and interconnecting conduit 87 is provided at the bottom of basin 34 for draining the impregnant 21' therefrom. The excess impregnant may be drained into a sump (not shown) and pumped back into reservoir 18 or it may be advantageous to maintain its level in wetting contact with the lower surfaces of wheels 31. In this instance, the valve 84 in conduit 87 is closed thereby forcing the level of impregnant 21' in basin 34 to rise. The desired wetting level of the impregnant is maintained by an opening 81 in wall 35 of the basin which functions as an overflow means for that influx of impregnant exceeding a predetermined volume. All excess impregnant material flowed through the opening 81 is gravitationally channeled back to the reservoir 18 via a trough 41.

In viewing edge surface deformation of the wheel annuli 90 and 91, FIG. 6, the cross section of a strand 12 is observed at the interface A in a somewhat rounded or elliptical shape. Since this is dependent on the speed, contact pressure and elasticity of the wheel surfaces, by manipulation of these parameters, the individual filaments 15 may be compressed to form a variety of strand cross-sectional shapes. This approach in shaping the strand may, however, be subservient to controlling the degree of impregnation. For example, a conflict arises when the pressure required to flatten a strand results in the removal of too much impregnant.

In this regard, FIG. 7 illustrates a die wheel arrangement which might be utilized to enhance flat strand shaping without disrupting control over impregnation. The overall apparatus is strikingly similar to that of FIG. 6 but for the fact that wheel 131 is fabricated from a relatively hard material such as Teflon. The peripheral edge of wheel 131 is also provided with a number of continuous spaced very shallow grooves 116. As seen at the interface A', the force exerted by the resilient surface of wheel 130 on the strand 112 resting against the hard surface of wheel 131 tends to spread the filaments 115 into a more flattened cross-sectional pattern. The grooves 116 further aid in spreading of the filaments 115 and serve to impede impregnant removal by reducing the pressure on the strands riding in the grooves.

A modified embodiment of the die apparatus shown in FIG. 8 includes a plurality of top wheels 230 which are virtually identical to and function much in the same manner as the wheels 30 shown in FIG. 2. The top wheels are frictionally driven by a roll 231 which is supported by a rotatable shaft 297 driven by a motor and transmission means (not shown). The roll 231 has an elastomeric exterior surface around which a plurality of continuous equidistant grooves 299 appear. Normally, the grooves are machined in the roll hub surface 295 prior to its being covered with an overlayer of elastomeric material. Each groove 299 is aligned with the circumferential surface of a top wheel 230 such that when a strand 212 is fed between the contact surfaces 290 and 291, the groove receives a peripheral segment of the strand and performs in the manner of a shaped die. It should be understood that surfaces 290 of the top wheels may be provided with mating grooves and that both configurations may be employed with any of the dies herein described. Likewise, the mating grooved die approach may be utilized in die wheel constructions having relatively hard or non-resilient contact surfaces.

The deformation force applied to wheels 230 and 231 to control the disposition of impregnant on the strands 212 is supplied by contacting wheel 227 which is rotatably mounted by a clevis arrangement provided at the free end of a piston rod 273. Rod 273 is selectively positioned by an pneumatic cylinder 265 which is secured to a fixed surface 277. Air is supplied to cylinder 265 by a conduit 262 having a valve 274 therein which is electrically operated to control the air supply and thus ultimately the position of rod 273. The distributive deformation force exerted by wheel 227 is necessarily governed by the position of the piston rod 273.

The voltage V across the primary coil 281 of valve 274 is selectively set by proper switching means and associated circuitry (not shown) to automatically position the wheel 227 as desired. The circuit may further be connected with overall control of the production line, e.g. a voltage may be developed to re-position wheel 227 when a strand breaks by activating the circuit with a sensing switch located in guide eyes 17 and/or 50 (FIG. 1).

FIG. 9 illustrates another dynamic die apparatus wherein vertically adjacent belts 330 and 331 move in an endless fashion around pairs of pulleys or rolls 393 and 398. The belts 330 and 331 are elastomeric or an elastomeric material is secured to an overlayer of the outer surface of each belt to provide longitudinally parallel moving contact surfaces 390 and 391 which envelop and wipe the strands 312 as they are passed between. The driving force may be frictionally supplied by the lower belt 331 or each belt unit may be provided with separate drive means. Top rolls 393, and consequently the entire top unit, may simultaneously be lifted by a mechanical or pneumatic apparatus to facilitate insertion or removal of strands 312.

Referring to FIG. 10, multiple glass strands 412 are guided in an arcuate path around a large revolving drum or cylinder 431 by a series of guide rolls 419 and pulleys 420. In traversing this distance, the strands are further passed between a roll 430 moving in contact with the surface of cylinder 431. Essentially, the respective contact surfaces of roll 430 and cylinder 431 are fabricated from a resilient or elastomeric material which allows them to deform around each strand 412 and act as strand wiping dies. A variable deformation force may be applied to roll 430 and a number of rolls as shown may be used to increase strand wiping capacity.

As the strands 412 move around the guide rolls 419, they are saturated with an elastomeric dispersion 421 sprayed from a nozzle applicator 422. A reservoir 442 having a metered amount of impregnant therein is positioned beneath the drum 431 to further catch excess impregnant removed from the strands. A drain conduit 483 extending from the bottom of reservoir 442 is connected to a pump 436 which pumps the impregnant through a conduit 487 to the nozzel applicator 422. An electrically or mechanically operated valve 484 is located in the conduit 487 for controlling the rate at which impregnant 421 is applied to the strands 412.

Guide rolls 419 have moderately hard elastomeric surfaces so that their operation in conjunction with drum 431 will spread and flatten the strands for better impregnation. Under some circumstances, impregnation may further be improved by rotating at least one of the rolls 419 simultaneously in contact with impregnant 421. In fact, a print-on impregnant application such as this may be utilized with all previously described embodiments of this invention. The successive rolls may also be provided with grooves of different shapes or deviating patterns such as half flat, half elliptical or semi-circular to effect a working of the impregnant into the strands as they move over the cylinder 431.

Various structural changes and additions may be incorporated into the instant invention without preempting coverage of the innovative concept. As illustrated, it is evident that the top die wheels can be driven by an independent source and that the overall die wheel combination can be utilized in a non-horizontal manner. Likewise, it should be evident that various other arrangements might be employed to exert a variable pressure on the moving strands, e.g. the top die wheels can be secured to pivotal supports having a variable movement force applied thereto. Furthermore, additional components such as squeegees, etc. can be used to clean the wheel surfaces and prevent entanglement of broken strands therewith.

While we have herein shown and described particular embodiments of our invention, it will be understood that we are not limited thereto and that modifications may be made without departing from the true scope and spirit of the invention.

We claim:

1. Apparatus for impregnating fibrous glass strands, comprising:

an impregnating bath through which a plurality of said glass strands are passed;

a two part die unit, each part having a resiliently deformable moving surface, said resiliently deformable moving surface of each part cooperating together in a contacting relationship to form an enveloping contact around each of said glass strands received from said impregnating bath and to exert pressure on said strands to remove impregnant from said strands in amounts dependent upon the pressure applied thereto by said surfaces;

means for selectively adjusting the pressure exerted on said strands by the adjacent surfaces of said die units;

the said adjacent surfaces of said die unit being provided by a pair of wheels rotating about parallel axis, the wheels being mounted one above the other;

means to maintain at least one said wheel wetted; and the means for selectively adjusting the pressure exerted on said strands comprising a variable load for exerting a static force, and a system for transmitting said force to said wheels including an idler wheel above said other wheels which is driven by friction of contact with said other upper wheel, the static force passing through said idler wheel such that said other wheels are made to exert a pressure on said linear material dependent on the magnitude of said force.

2. Apparatus for impregnating fibrous glass strands as recited in claim 1 wherein there is further provided a means for pulling said glass strands between said adjacent moving surfaces and a driving means for moving said adjacent surfaces and at a lower speed than said glass strands whereby said adjacent surfaces are made to perform essentially as a static wiping die.

* * * * *